(12) United States Patent
Lv et al.

(10) Patent No.: US 10,495,539 B2
(45) Date of Patent: Dec. 3, 2019

(54) ALUMINUM ALLOY HUB POSITIONING FIXTURE

(71) Applicant: CITIC Dicastal CO., LTD, Qinhuangdao (CN)

(72) Inventors: Jinqi Lv, Qinhuangdao (CN); Zhipeng Li, Qinhuangdao (CN); Hanbao Sun, Qinhuangdao (CN); Zhuxing Wang, Qinhuangdao (CN); Hongfu Jin, Qinhuangdao (CN); Yingwei Zhu, Qinhuangdao (CN); Ling Jiang, Qinhuangdao (CN); Zhihua Zhu, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 111 days.

(21) Appl. No.: 15/839,171

(22) Filed: Dec. 12, 2017

(65) Prior Publication Data
US 2019/0033159 A1    Jan. 31, 2019

(30) Foreign Application Priority Data
Jul. 31, 2017    (CN) .......................... 2017 1 0635542

(51) Int. Cl.
*G01M 1/16*    (2006.01)
*G01M 17/013*    (2006.01)
*G01M 3/32*    (2006.01)

(52) U.S. Cl.
CPC .............. *G01M 1/16* (2013.01); *G01M 3/329* (2013.01); *G01M 17/013* (2013.01)

(58) Field of Classification Search
CPC ........ G01M 1/16; G01M 3/329; G01M 3/103; G01M 3/227; G01M 3/202; G01M 3/226; G01M 3/3218; G01M 17/013; G01M 17/024; G01M 17/021
See application file for complete search history.

(56) References Cited

U.S. PATENT DOCUMENTS

| 5,850,036 A * | 12/1998 | Giromini | G01M 3/202 73/40 |
| 6,330,821 B1 * | 12/2001 | Arnold | G01M 3/227 73/40 |
| 9,248,707 B2 * | 2/2016 | Zhou | B60C 23/003 |
| 9,863,838 B2 * | 1/2018 | Liu | G01M 3/329 |
| 10,234,352 B2 * | 3/2019 | Liu | B60C 23/04 |
| 2004/0011117 A1 * | 1/2004 | Dutt | G01M 3/3218 73/48 |

(Continued)

*Primary Examiner* — Helen C Kwok
(74) *Attorney, Agent, or Firm* — Calfee, Halter & Griswold LLP

(57) ABSTRACT

The invention provides an aluminum alloy hub positioning fixture. The aluminum alloy hub positioning fixture adopts an upper trapezoidal metal taper sleeve and a lower trapezoidal metal taper sleeve, the lower trapezoidal metal taper sleeve is in contact with the central hole of a hub, and the upper trapezoidal metal taper sleeve is in contact with the cap section of the hub; the lower trapezoidal metal taper sleeve is mounted on a hollow shaft, and a metal pipe is arranged in the middle of the hollow shaft. During working, the hub is positioned and mounted on the lower trapezoidal metal taper sleeve via the central hole, the upper trapezoidal metal taper sleeve is in vertical contact with the cap section of the hub under the action of a cylinder.

4 Claims, 1 Drawing Sheet

(56) References Cited

U.S. PATENT DOCUMENTS

2015/0276542 A1* 10/2015 Bowen ................ G01M 3/103
  73/45.6
2016/0223425 A1   8/2016 Liu et al.
2016/0368332 A1  12/2016 Liu et al.

* cited by examiner

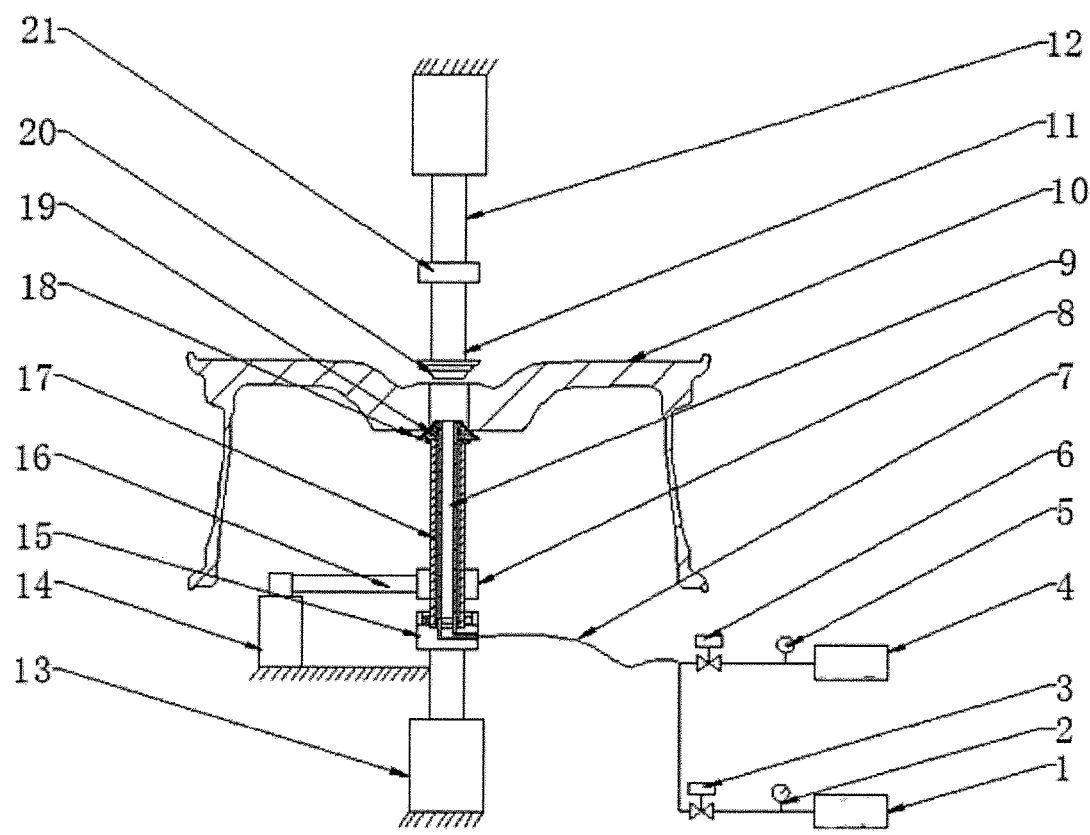

ALUMINUM ALLOY HUB POSITIONING FIXTURE

CROSS-REFERENCE TO RELATED APPLICATIONS

This application claims priority to Chinese Patent Application No. 201710635542.X filed on Jul. 31, 2017, which is hereby incorporated by reference in its entirety.

TECHNICAL FIELD

The present application relates to a positioning fixture, relating to the field of machinery.

BACKGROUND ART

In the prior art, an aluminum alloy hub is placed on a positioning fixture of dynamic balance and runout detection equipment by adopting a clamping mode of central hole positioning during dynamic balance and runout detection, wherein the positioning fixture adopts a steel split expansion sleeve or a steel integrated taper sleeve.

In actual detection, the inner surface of the central hole of the aluminum alloy hub is in contact with the outer surface of the steel fixture, the central hole of the aluminum alloy hub may be damaged in the contact process of the steel fixture and the aluminum alloy hub, and a phenomenon that aluminum scraps drop occurs.

If the positioning fixture is a steel split expansion sleeve, the dropped aluminum scraps fall into the slide way of the expansion sleeve, thus the expansion sleeve is blocked, and the positioning and clamping precision of the detection equipment and the detection results are affected directly.

If the positioning fixture is a steel integrated taper sleeve, the dropped aluminum scraps fall onto the surface of the taper sleeve, thus aluminum is attached to the surface of the taper sleeve; meanwhile, part of the aluminum scraps may enter the inner surface of the taper sleeve, so that the clearance between the main shaft of the fixture and the taper sleeve becomes large, and the positioning and clamping precision of the detection equipment and the detection results are affected directly.

Upon said analysis, the application of the steel positioning fixture inevitably causes the phenomenon that aluminum scraps drop from the aluminum alloy hub, and the positioning accuracy of the fixture may be affected if the aluminum scraps are accumulated. Particularly in an automatic production line, hubs are continuously detected by the detection equipment, aluminum scraps are accumulated seriously, and if the automatic production line is stopped frequently for cleaning the aluminum scraps, the production cycle may be prolonged, the production efficiency may decline, and the short-time cleaning effect is not quite ideal.

SUMMARY OF THE INVENTION

Thus, the present application is aimed at providing an aluminum alloy hub positioning fixture, which does not occur dropping aluminum scraps, has small contact force in the positioning process and reduces the interference of random vibration signals to signals of detection equipment.

The aluminum alloy hub positioning fixture includes a vacuum extraction system, a vacuum gauge, an electromagnetic valve, a compressed air system, a pressure gauge, an electromagnetic valve, a metal hose, a belt pulley, a metal pipe, an upper rotating shaft, an upper cylinder, a lower cylinder, a servo motor, a bearing seat, a belt, a lower rotating shaft, rubber sheaths, a trapezoidal taper sleeve A, a trapezoidal taper sleeve B and a bearing seat.

The trapezoidal taper sleeve A is matched with the trapezoidal taper sleeve B, the trapezoidal taper sleeve A acts on the cap section of a hub, and the trapezoidal taper sleeve B acts on the central hole of the hub.

In a preferred aspect of the present application, the rubber sheaths are stuck on the surfaces of the trapezoidal taper sleeve A and the trapezoidal taper sleeve B.

In a preferred aspect of the present application, the positioning fixture can drive the hub to rotate at a high speed under the coordination of the upper rotating shaft and the lower rotating shaft.

In a preferred aspect of the present application, the lower rotating shaft is a hollow shaft in order to mount the metal pipe.

In a preferred aspect of the present application, the belt pulley is mounted on the lower rotating shaft to drive the lower rotating shaft to rotate via the belt under drive of the servo motor.

In a preferred aspect of the present application, when the trapezoidal taper sleeve A and the trapezoidal taper sleeve B are matched with the hub into a closed space, the vacuum extraction system extracts vacuum from the closed space via the metal pipe, thereby ensuring the trapezoidal taper sleeve A and the trapezoidal taper sleeve B are matched with the hub tightly and firmly under the action of atmospheric pressure.

In a preferred aspect of the present application, when the trapezoidal taper sleeve A and the trapezoidal taper sleeve B need to be separated from the hub after matched into the closed space, the compressed air system charges air to the closed space via the metal pipe, thereby ensuring the trapezoidal taper sleeve A and the trapezoidal taper sleeve B can be separated from the hub under the action of the compressed air.

In a preferred aspect of the present application, the vacuum extraction system includes a vacuum pump, the vacuum gauge is mounted at the front end of the vacuum extraction system, and one of the electromagnetic valves is mounted at the front end of the vacuum gauge. When the vacuum extraction system extracts vacuum, the electromagnetic valve mounted at the front end of the vacuum gauge is opened, the other electromagnetic valve is closed, and the vacuum gauge displays the value of vacuum degree.

In a preferred aspect of the present application, the compressed air system includes a compressed air source, the pressure gauge is mounted at the front end of the compressed air system, and the other electromagnetic valve is mounted at the front end of the pressure gauge. When the compressed air system charges compressed air, the electromagnetic valve mounted at the front end of the pressure gauge is opened, the electromagnetic valve mounted at the front end of the vacuum gauge is closed, and the pressure gauge displays the pressure value of the compressed air.

In a preferred aspect of the present application, the electromagnetic valve and the electromagnetic valve are connected with one end of the metal hose.

In a preferred aspect of the present application, the other end of the metal hose is connected with one end of the metal pipe in the bearing seat, and the metal hose is adopted to ensure the metal pipe follows the lower rotating shaft to move vertically.

In a preferred aspect of the present application, the metal pipe is mounted in the inner hole of the lower rotating shaft, one end of the metal pipe is assembled together with the inner hole of the trapezoidal taper sleeve A via a bearing, and the other end of the metal pipe is assembled together with the inner hole of the rotating shaft via a bearing.

In a preferred aspect of the present application, one end of the lower rotating shaft is mounted in the bearing seat, and they are assembled together via a bearing. The belt pulley is mounted on the section, close to the bearing seat, of the outer surface of the lower rotating shaft; the other end of the lower rotating shaft is mounted on the lower surface of the trapezoidal taper sleeve A, and they are connected together via a bolt.

In a preferred aspect of the present application, the servo motor is assembled together with the belt pulley via the belt.

In a preferred aspect of the present application, one end of the lower cylinder is fixed on a base, the bearing seat is mounted at one end of a piston rod of the lower cylinder, and the servo motor is fixedly connected with the piston rod of the lower cylinder.

In a preferred aspect of the present application, one end of the upper cylinder is fixed on the base, and the bearing seat is mounted at one end of a piston rod of the upper cylinder. The upper rotating shaft is mounted on the bearing seat, and they are assembled together via a bearing.

In a preferred aspect of the present application, the trapezoidal taper sleeve B is mounted on the other section of the upper rotating shaft, and they are connected together via threads.

When the hub is conveyed to a position just above the lower cylinder via an automatic roller bed, the automatic roller bed stops running, and the lower cylinder drives the lower rotating shaft to ascend, till the trapezoidal taper sleeve A is in contact with the central hole of the hub.

The present application adopting the trapezoidal taper sleeves for positioning the hub is applicable to hubs having large central hole diameters, and may reduce the fixture replacing time. The rubber sheaths are mounted on the surfaces of the trapezoidal taper sleeves, thereby avoiding metal friction between the steel trapezoidal taper sleeves and the hub, and eliminating the phenomenon that aluminum scraps drop. The present application adopts upper and lower rotating shafts, wherein the lower rotating shaft is a drive shaft, and the upper rotating shaft is a driven shaft. The present application adopts a vacuum extraction mode to ensure that the positioning clamping force is sufficient to overcome centrifugal force generated by high-speed rotation of the hub. The positioning fixture is separated from the hub by charging compressed air.

BRIEF DESCRIPTION OF DRAWINGS

The implementation scheme of the present application will be specified below in combination with an accompanying drawing.

FIG. 1 is a structural schematic diagram of an aluminum alloy hub positioning fixture.

In which, 1—vacuum extraction system, 2—vacuum gauge, 3—electromagnetic valve, 4—compressed air system, 5—pressure gauge, 6—electromagnetic valve, 7—metal hose, 8—belt pulley, 9—metal pipe, 10—hub, 11—upper rotating shaft, 12—upper cylinder, 13—lower cylinder, 14—servo motor, 15—bearing seat, 16—belt, 17—lower rotating shaft, 18—rubber sheath, 19—trapezoidal taper sleeve A, 20—trapezoidal taper sleeve B, 21—bearing seat.

DETAILED DESCRIPTION OF THE INVENTION

An aluminum alloy hub positioning fixture will be described in detail below in combination with FIG. 1.

Embodiment 1: An aluminum alloy hub positioning fixture includes a vacuum extraction system 1, a vacuum gauge 2, an electromagnetic valve 3, a compressed air system 4, a pressure gauge 5, an electromagnetic valve 6, a metal hose 7, a belt pulley 8, a metal pipe 9, an upper rotating shaft 11, an upper cylinder 12, a lower cylinder 13, a servo motor 14, a bearing seat 15, a belt 16, a lower rotating shaft 17, rubber sheaths 18, a trapezoidal taper sleeve A 19, a trapezoidal taper sleeve B 20 and a bearing seat 21.

The vacuum extraction system 1 includes a vacuum pump, the vacuum gauge 2 is mounted at the front end of the vacuum extraction system 1, and the electromagnetic valve 3 is mounted at the front end of the vacuum gauge 2. When the vacuum extraction system 1 extracts vacuum, the electromagnetic valve 3 is opened, the electromagnetic valve 6 is closed, and the vacuum gauge 2 displays the value of vacuum degree.

The compressed air system 4 includes a compressed air source, the pressure gauge 5 is mounted at the front end of the compressed air system 4, and the electromagnetic valve 6 is mounted at the front end of the pressure gauge 5. When the compressed air system 4 charges compressed air, the electromagnetic valve 6 is opened, the electromagnetic valve 3 is closed, and the pressure gauge 5 displays the pressure value of the compressed air.

The electromagnetic valve 3 and the electromagnetic valve 6 are connected with one end of the metal hose 7.

The other end of the metal hose 7 is connected with one end of the metal pipe 9 in the bearing seat 15, and the metal hose 7 is adopted to ensure the metal pipe 9 follows the lower rotating shaft 17 to move vertically.

The metal pipe 9 is mounted in the inner hole of the lower rotating shaft 17, one end of the metal pipe 9 is assembled together with the inner hole of the trapezoidal taper sleeve A 19 via a bearing, and the other end of the metal pipe 9 is assembled together with the inner hole of the rotating shaft 17 via a bearing.

One end of the lower rotating shaft 17 is mounted in the bearing seat 15, and they are assembled together via a bearing. The belt pulley 8 is mounted on the section, close to the bearing seat 15, of the outer surface of the lower rotating shaft 17; the other end of the lower rotating shaft 17 is mounted on the lower surface of the trapezoidal taper sleeve A 19, and they are connected together via a bolt.

The servo motor 14 is assembled together with the belt pulley 8 via the belt 16.

One end of the lower cylinder 13 is fixed on a base, the bearing seat 15 is mounted at one end of a piston rod of the lower cylinder 13, and the servo motor 14 is fixedly connected with the piston rod of the lower cylinder 13.

One end of the upper cylinder 12 is fixed on the base, and the bearing seat 21 is mounted at one end of a piston rod of the upper cylinder 12. The upper rotating shaft 11 is mounted on the bearing seat 21, and they are assembled together via a bearing.

The trapezoidal taper sleeve B 20 is mounted on the other end of the upper rotating shaft 11, and they are connected together via threads.

The rubber sheaths 18 are mounted on the outer surfaces of both the trapezoidal taper sleeve A 19 and the trapezoidal taper sleeve B 20.

When the hub 10 is conveyed to a position just above the lower cylinder 13 via an automatic roller bed, the automatic roller bed stops running, and the lower cylinder 13 drives the lower rotating shaft 17 to ascend, till the trapezoidal taper sleeve A 19 is in contact with the central hole of the hub 10.

Embodiment 2: The aluminum alloy hub positioning fixture is applied to a full automatic hub production line.

When the hub 10 is conveyed to the position just above the lower cylinder 13 via the automatic roller bed, the automatic roller bed of the current detection station stops running, and the lower cylinder 13 drives the lower rotating shaft 17 to ascend, till the trapezoidal taper sleeve A 19 is in contact with the central hole of the hub 10.

Meanwhile, the upper cylinder 12 drives the upper rotating shaft 11 to descend, till the trapezoidal taper sleeve B 20 is in contact with the cap section of the hub 10.

A closed space is formed among the trapezoidal taper sleeve A 19, the trapezoidal taper sleeve B 20 and the hub 10.

At the moment, the electromagnetic valve 6 is closed, the electromagnetic valve 3 is opened, the vacuum extraction system 1 extracts vacuum from the closed space via the metal pipe 9 and the metal hose 7, and when the indicated value of the vacuum gauge 2 reaches a set value, preferably a vacuum degree 3-5 Pa, it indicates that the trapezoidal taper sleeve A 19 and the trapezoidal taper sleeve B 20 have been in tight fit with the hub 10.

After the trapezoidal taper sleeve A 19 and the trapezoidal taper sleeve B 20 are in tight fit with the hub 10, the servo motor 14 drives the belt pulley 8 and the lower rotating shaft 17 to rotate via the belt 16, and the lower rotating shaft 17 drives the hub 10 and the upper rotating shaft 11 to rotate together.

After the hub 10 rotates, corresponding dynamic balance or runout detection can be completed. Under the action of vacuum, the acting force between the trapezoidal taper sleeve A 19 or the trapezoidal taper sleeve B 20 and the hub 10 is very large and further greater than the centrifugal force generated by high-speed rotation of the hub 10.

After the detection of the hub 10 is completed, the servo motor 14 stops running. The electromagnetic valve 6 is opened, the electromagnetic valve 3 is closed, and the vacuum extraction system 1 stops running; the compressed air system 4 charges air into the closed space via the metal pipe 9 and the metal hose 7, and when the indicated value of the pressure gauge 5 reaches a set value, preferably 0.3-0.6 MPa, it indicates that the trapezoidal taper sleeve A 19 and the trapezoidal taper sleeve B 20 can be separated from the hub 10.

Thus, this positioning fixture may improve the detection speed and accelerate the detection cycle; and crucially, the positioning fixture avoids the phenomenon that aluminum scraps occurs in the detection link, reduces the artificial maintenance cost, improves the production efficiency, and simultaneously reduces the phenomenon of accuracy distortion caused by accumulation of aluminum scraps.

Embodiment 3: The aluminum alloy hub positioning fixture is applied to a hub runout tester.

100 hubs are randomly selected, each hub is repeatedly clamped and measured 10 times, and compared with the measured data of the runout tester in the prior art, the measured results show that the extreme differences of the repeated measurement are within 0.01 mm and superior to 0.04 mm required by the prior art.

Those skilled in the art could easily learn that the clamping force, acting on the hub, of the aluminum alloy hub positioning fixture in the present application is further greater than the clamping force acting on the hub in the prior art. Therefore, the present application may completely replace the prior art.

Embodiment 4: The aluminum alloy hub positioning fixture is applied to a hub dynamic balance tester.

100 hubs are randomly selected, each hub is repeatedly clamped and measured 10 times, and compared with the measured data of the dynamic balance tester in the prior art, the measured dynamic balance value results show that the extreme differences of the repeated measurement are within 2 g and superior to 5 g required by the prior art.

Those skilled in the art could easily learn that the clamping force, acting on the hub, of the aluminum alloy hub positioning fixture in the present application is further greater than the clamping force acting on the hub in the prior art. Therefore, the present application may completely replace the prior art.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An aluminum alloy hub positioning fixture, comprising a vacuum extraction system, a vacuum gauge, first and second electromagnetic valves, a compressed air system, a pressure gauge, a metal hose, a belt pulley, a metal pipe, an upper rotating shaft, an upper cylinder, a lower cylinder, a servo motor, a bearing seat, a belt, a lower rotating shaft, rubber sheaths, a trapezoidal taper sleeve A, a trapezoidal taper sleeve B and a bearing seat;

wherein the rubber sheaths are mounted on surfaces of both the trapezoidal taper sleeve A and the trapezoidal taper sleeve B;

the bearing seat is mounted between the upper rotating shaft and the upper cylinder; one end of the upper rotating shaft is configured to rotate axially around the bearing seat the trapezoidal taper sleeve B is mounted at another end of the upper rotating shaft via threaded connection;

the lower rotating shaft is a hollow shaft one end of the lower rotating shaft is connected with the trapezoidal taper sleeve A via a bolt, and another end of the lower rotating shaft is connected with the bearing seat via a bearing;

the lower rotating shaft is configured to rotate axially around the bearing seat; the metal pipe is assembled on an inner surface of one end, connected with the bearing seat, of the lower rotating shaft via a bearing; the belt pulley is mounted on an outer surface of one end, connected with the bearing seat, of the lower rotating shaft in an interference connection manner;

one end, connected with the trapezoidal taper sleeve A, of the metal pipe is assembled on an inner surface of the trapezoidal taper sleeve A via a bearing; one end, connected with the bearing seat, of the metal pipe is in threaded connection with the metal hose;

the vacuum gauge is mounted at front end of the vacuum extraction system, and the first electromagnetic valve is mounted at front end of the vacuum gauge; the pressure gauge is mounted at front end of the compressed air system, and the second electromagnetic valve is mounted at front end of the pressure gauge; the first electromagnetic valve and the second electromagnetic valve are connected with one end of the metal hose;

the servo motor is assembled together with the belt pulley via the belt;

one end of the lower cylinder is fixed on a base, the bearing seat is mounted at one end of a piston rod of the lower cylinder, and the servo motor is fixedly connected with the piston rod of the lower cylinder.

2. The aluminum alloy hub positioning fixture of claim 1, the trapezoidal taper sleeve A and the trapezoidal taper sleeve B are in a metal step shape with each layer having a taper, and are configured to be applied to hubs having different central hole sizes.

3. The aluminum alloy hub positioning fixture of claim 1, when the vacuum extraction system extracts vacuum, a vacuum degree is 3-5 Pa.

4. The aluminum alloy hub positioning fixture of claim 1, when the compressed air system charges air, an air charging pressure is 0.3-0.6 MPa.

\* \* \* \* \*